Patented Jan. 30, 1951

2,539,911

UNITED STATES PATENT OFFICE 2,539,911

COAGULATION OF NATURAL RUBBER LATEX

Joseph P. Johnson, Akron, Ohio, assignor to Wingfoot Corporation, Akron, Ohio, a corporation of Delaware No Drawing. Application February 17, 1950, Serial No. 144,851

5 Claims. (Cl. 260—821)

This invention relates to the coagulation of natural rubber latices and more particularly to the preparation of a coagulum that can readily be reduced to discrete particles which can be subsequently dewatered, ground and dried without coalescence and still retain enough cohesiveness for baling.

Until the recent war, natural rubber, chiefly from the rubber tree, provided almost the entire requirements of the world. The war compelled rubber manufacturers to develop a synthetic substitute for natural rubber and, for several years past, the great proportion of rubber produced was synthetic, consisting particularly of the copolymer of butadiene and styrene. The methods of processing natural and synthetic rubbers are quite different because of the inherent differences in physical properties of the natural latex and the synthetic latex produced by the copolymerizing reaction. Accordingly, the production facilities now available are not entirely suited for the processing of natural rubber. The coagulum from the synthetic rubber latex is readily reduced to discrete particles or "crumbs" capable of convenient handling by continuous operations, such as washing, drying, conveying and mixing. It has been recognized that the same continuous operations would be desirable in the processing of natural rubber, but the natural rubber coagulum is too tough to be ground economically. In addition to the inherent toughness of the natural rubber coagulum, it exhibits a tackiness or cohesiveness in the wet coagulated stage which tends always towards mass coagulum formation. Thus, under all usual coagulation systems the natural rubber comes down in large masses, frequently trapping large amounts of uncoagulated fluid latex within the body of the lump.

Therefore, one purpose of this invention is to provide a coagulation system wherein the particles formed by contact of natural latex with coagulant become and remain discrete particles or "crumbs" rather than, as in the usual procedure, to agglomerate and form large masses difficult to handle.

Another purpose of this invention is to adapt the continuous synthetic rubber production operations to natural rubber production.

Another purpose is to secure good control of the particle size of the granular precipitate of rubber, with an avoidance of oversize particles and fines.

It has been known that natural rubber latex may be coagulated by means of zinc salt solutions. The method of this invention, however, involves the use of any soluble zinc salt in the presence of a substantial quantity of ammonium hydroxide. For best results, the proportion of zinc salt to ammonium hydroxide should be such as to satisfy the equation

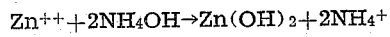
$$Zn^{++} + 2NH_4OH \rightarrow Zn(OH)_2 + 2NH_4^+$$

Generally, satisfactory crumb coagulation can be achieved by contacting the natural rubber latex with zinc salt solutions in the presence of at least 75 percent of the molecular proportions of ammonia required to satisfy the above equation. On the other hand, if more than 200 percent of the theoretical quantity of ammonia to satisfy the equation is used, the rubber will be precipitated in massive form and the desired crumb coagulation will not take place. Thus, if there is present between 1.5 and 4 mols of ammonium hydroxide for each mol of zinc salt, crumb rubber will be formed which can be conveniently processed.

Frequently, small amounts of ammonium hydroxide or an alkali metal hydroxide, such as sodium hydroxide, are used to stabilize the natural rubber latices. These amounts are always less than the quantity of ammonium hydroxide used in the practice of this invention. If these stabilizers are present, the quantities thereof must be considered in the determination of the molecular proportions of ammonium hydroxide to be added. For example, if a small amount of sodium hydroxide is present in the latex, the coagulation solutions should be adjusted so that the total hydroxide concentration in the coagulation bath, including the sodium hydroxide and the ammonium hydroxide, is equal to from 1.5 to 4 mols for each mol of zinc salt. Obviously, when ammonium hydroxide is present in the latex, the ammonium hydroxide added for the practice of this invention should be the difference between the amount already present and the 1.5 to 4 mols required for each mol of zinc salt.

Although any water-soluble zinc salt, such as zinc acetate and zinc nitrate, may be used, for reasons of economy zinc sulfate, and particularly zinc chloride, are preferred. The salt is dissolved in water and the required ammonium hydroxide is added thereto. The coagulation is effected by gradually adding the latex to the solution or by continuously combining them with the quantities regulated so the desired proportion of latex and salt solutions are always present. Solutions containing 0.25 to 5 percent by weight are most desirable. The total quantity of salt added will influence the coagulum yield. While any amount of salt may be used to coagulate the latex, it has been found that the most economical operations use between 2 and 20 pounds of zinc salt per hundred pounds of rubber. Thus, the coagulant solution contains (a) from 0.25 to 5 percent by weight of the zinc salt and (b) from 1.5 to 4 mols of ammonium hydroxide per mol of the zinc salt and the latex and coagulant solution are preferably used in such proportions that the amount of zinc salt is 2 to 20 percent by weight of the rubber in the latex.

It has been found that natural rubber latex, or latices which have been concentrated, deproteinized or otherwise beneficiated may be treated in accordance with this invention.

The coagulation of the rubber is performed in an agitated tank containing the salt solution by the addition of latex at the desired rate. Continuous operations may also be used as long as the critical proportions of reagents are present. The precipitated rubber particles remain in suspension without agglomerating, and can be separated by any conventional filtration procedure. The filter cake can be broken up into fragments of any desired size for washing, drying and subsequent processing steps. This is a substantial improvement over the usual methods of processing the masses obtained by ordinary coagulation techniques, and at the same time it enables the use of the synthetic processing equipment already installed for synthetic rubber production.

Further details of this invention are set forth with respect to specific examples as follows.

Example 1

A series of lots of natural rubber latex containing 30 percent rubber, were each coagulated by a solution of 2½ grams of zinc chloride in 500 cc. of water using varying proportions of ammonium hydroxide. The latex was added gradually and continued as long as a crumb rubber was obtained. Below are tabulated the results of the various experiments showing in each case the quantity of latex coagulated, the quantity of rubber produced in crumb form, the quantity of ammonium hydroxide used and the quantitative relationship of the zinc salt to ammonium hydroxide.

| Cc. Latex Coagulated | Grams of Solution of 28% $NH_3$ | Molar Percent with respect to zinc chloride | Results |
|---|---|---|---|
| ----- | 1.15 | 100 | Large sticky crumbs. |
| 243 | 1.65 | 150 | Granular (73 grams). |
| 350 | 2.3 | 200 | Granular (105 grams). |
| 247 | 4.6 | 400 | Granular (74 grams). |
| 177 | 6.9 | 600 | Granular (53 grams). |
| ----- | 9.2 | 800 | Mass Coagulation. |

Example 2

A 55 gallon drum, equipped with a portable agitator, was charged with 200 pounds of water at a temperature of 70° F. After dissolving 1 pound of $ZnCl_2$, ammonium hydroxide (28% $NH_3$) was added until the solution was pH 8.5. At this end point, approximately two mols of ammonium hydroxide had been used for each mol of zinc chloride. A natural rubber latex, containing 30 percent rubber, was added gradually. The rubber coagulated in discrete particles and the suspension was readily filtered. About 11 pounds of zinc chloride was used per 100 pounds of dry rubber content. About 30 pounds of rubber latex was coagulated and the rubber so obtained was readily processed to a high grade product having a very low water absorption because of the minimum quantity of impurities entrapped by the coagulation.

This application is a continuation-in-part of my copending application Serial No. 654,219, filed March 13, 1946, now abandoned.

Although the invention has been described with respect to specific examples, it is not intended that the details thereof shall be construed as limitations upon the scope of the invention except to the extent incorporated in the following claims.

I claim:

1. A method of flocculating natural rubber latex which comprises adding the latex to an aqueous coagulant solution containing (a) 0.25 to 5 percent by weight of a water-soluble zinc salt and (b) 1.5 to 4 mols of ammonium hydroxide per mol of the zinc salt.

2. A method of flocculating natural rubber latex which comprises adding the latex to an aqueous coagulant solution containing (a) 0.25 to 5 percent by weight of a water-soluble zinc salt and (b) 1.5 to 4 mols of ammonium hydroxide per mol of the zinc salt, the coagulant solution and latex being used in such proportions that the amount of zinc salt is 2 to 20 percent by weight of the rubber in the latex.

3. A method of flocculating natural rubber latex which comprises adding the latex to an aqueous coagulant solution containing (a) 0.25 to 5 percent by weight of zinc chloride and (b) 1.5 to 4 mols of ammonium hydroxide per mol of zinc chloride, the latex and coagulant solution being used in such proportions that the amount of zinc chloride is 2 to 20 percent by weight of the rubber in the latex.

4. A method of flocculating natural rubber latex which comprises adding the latex to an aqueous coagulant solution containing (a) 0.25 to 5 percent by weight of zinc sulfate and (b) 1.5 to 4 mols of ammonium hydroxide per mol of zinc sulfate, the latex and coagulant solution being used in such proportions that the amount of zinc sulfate is 2 to 20 percent by weight of the rubber in the latex.

5. A method of flocculating natural rubber latex containing sodium hydroxide as a stabilizing agent which comprises adding the latex to an aqueous coagulant solution containing (a) 0.25 to 5 percent by weight of a water-soluble zinc salt and (b) sufficient ammonium hydroxide so that the combined sodium hydroxide and ammonium hydroxide is equal to 1.5 to 4 mols per mol of the zinc salt, the latex and coagulant solution being used in such proportions that the zinc salt is 2 to 20 percent by weight of the rubber in the latex.

JOSEPH P. JOHNSON.

No references cited.